G. N. TIBBLES.
Improvement in Traction-Engine.
No. 130,085.            Patented July 30, 1872.
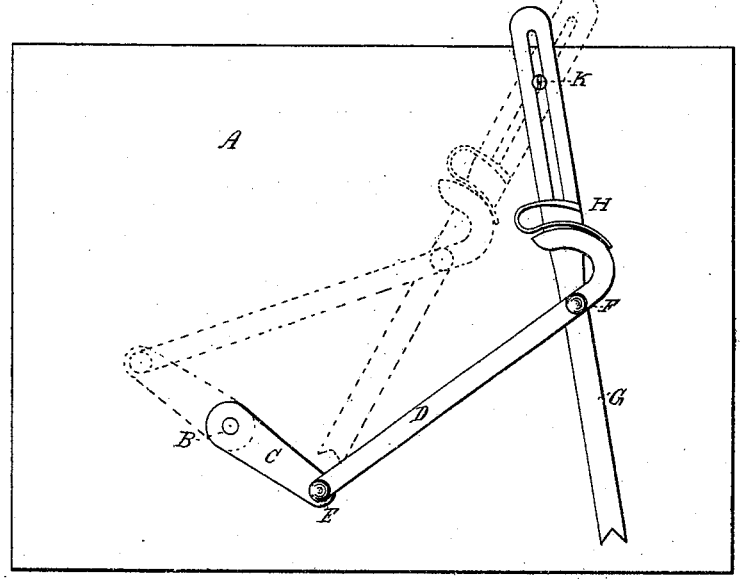
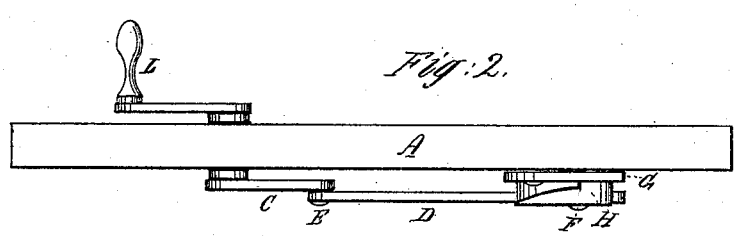
Witnesses  
Albet Weisenborn  
Edward Weisenborn
Inventor  
George N. Tibbles

UNITED STATES PATENT OFFICE.

GEORGE N. TIBBLES, OF HUDSON, NEW JERSEY.

IMPROVEMENT IN TRACTION-ENGINES.

Specification forming part of Letters Patent No. 130,085, dated July 30, 1872.

SPECIFICATION.

I, GEORGE N. TIBBLES, of Hudson City, Hudson county and State of New Jersey, have invented certain new and useful Improvements in Traction-Engine Movements, of which the following is a specification:

Nature and Object of the Invention.

This invention relates to the manner of driving vehicles by means of feet acting on the surface of the road, hereinafter more fully described.

Description of the Accompanying Drawing.

Figure I is a front view of my invention, showing the movement in two different positions. Fig. II is a top view of the same.

A is a board representing the frame of a wagon, &c., to which the movement is attached. B is the axle, on which crank C is fastened, and which is turned by handle L in the direction of the arrow, (Fig. I.) Rod D is joined to crank-pin E at one end, and pin F to the slotted pendulum-lever G. If crank-pin E revolves downward in the direction of the arrow, (Fig. I,) rod D forces pendulum-lever G onto the ground and moves the wagon forward. While crank-pin E is going upward the extending curved end of the rod D acts against spring-cam H in such a manner as raises pendulum-lever G from the ground. The slotted part of pendulum-lever G moves on stationary fulcrum K, which fulcrum makes the resisting bearing of pendulum-lever G.

Claims.

What I claim as my invention, and desire to secure by Letters Patent, is—

1. The combination of the rod D, with its extending curved end acting against the spring-cam H fastened on the slotted pendulum-lever G, and the stationary pin K, as and for the purpose herein described.

2. I claim the rod D, crank C, and spring-cam H, by means of which the pendulum-lever G is forced to the ground and raised up, as described.

GEO. N. TIBBLES.

Witnesses:
EDWARD WEISSENBORN,
ALBERT WEISENBORN.